(12) United States Patent
Khaligh

(10) Patent No.: US 9,814,640 B1
(45) Date of Patent: Nov. 14, 2017

(54) ROBOTIC ARM BED ASSIST

(71) Applicant: Shahzadeh Khaligh, Rancho Palos Verdes, CA (US)

(72) Inventor: Shahzadeh Khaligh, Rancho Palos Verdes, CA (US)

(73) Assignee: Space Technology Research LLC, Rancho Palos Verdes, CA (US)

( * ) Notice: Subject to any disclaimer, the term of this patent is extended or adjusted under 35 U.S.C. 154(b) by 101 days.

(21) Appl. No.: 14/998,582

(22) Filed: Oct. 31, 2014

(51) Int. Cl.
| | | |
|---|---|---|
| *A61G 7/05* | (2006.01) | |
| *A61G 7/00* | (2006.01) | |
| *A61G 7/10* | (2006.01) | |
| *B25J 9/00* | (2006.01) | |
| *B25J 9/16* | (2006.01) | |
| *B25J 9/04* | (2006.01) | |
| *B25J 13/06* | (2006.01) | |
| *B25J 13/00* | (2006.01) | |
| *B25J 11/00* | (2006.01) | |

(52) U.S. Cl.
CPC ............... *A61G 7/05* (2013.01); *A61G 7/001* (2013.01); *A61G 7/1017* (2013.01); *B25J 9/0009* (2013.01); *B25J 9/0087* (2013.01); *B25J 9/04* (2013.01); *B25J 9/161* (2013.01); *B25J 11/009* (2013.01); *B25J 13/006* (2013.01); *B25J 13/06* (2013.01); *A61G 2203/12* (2013.01); *A61G 2203/16* (2013.01); *Y10S 901/02* (2013.01); *Y10S 901/50* (2013.01)

(58) Field of Classification Search
None
See application file for complete search history.

(56) References Cited

U.S. PATENT DOCUMENTS

| | | | | | |
|---|---|---|---|---|---|
| 3,888,362 | A | * | 6/1975 | Fletcher | B25J 9/023 318/640 |
| 4,796,846 | A | * | 1/1989 | Meier | A61B 17/02 248/286.1 |
| 6,804,581 | B2 | * | 10/2004 | Wang | A61B 34/70 600/101 |
| 7,979,157 | B2 | * | 7/2011 | Anvari | A61G 13/10 700/245 |
| 8,833,707 | B2 | * | 9/2014 | Steinberg | A61G 13/101 128/849 |
| 9,254,234 | B2 | * | 2/2016 | Cooper | A61G 7/1017 |
| 9,510,812 | B2 | * | 12/2016 | Brown | A61B 17/02 |
| 2007/0095582 | A1 | * | 5/2007 | Stuijt | A61G 5/10 180/65.1 |
| 2014/0316436 | A1 | * | 10/2014 | Bar | A61B 19/2203 606/130 |

\* cited by examiner

*Primary Examiner* — Sarah McPartlin

(57) ABSTRACT

This invention, pertaining to hospital bed, is a new concept development for automation of services for bedridden patients in the variety of environments. The novelty introduced here is the use of robotic arms affixed on hospital type bed that operates by an electric keypad on the bed side or virtually from a remote location, i.e. a nursing station in the case of a hospital stay. The best mode of operation for this invention would be hospitals, home health care or other health care facilities and settings. This invention is a groundbreaking solution for healing the shortage of trained staff in the health care system.

4 Claims, 4 Drawing Sheets

ROBOTIC ARM BED ASSIST

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not applicable

FOREIGN APPLICATION DATA

N/A

BACKGROUND OF THE INVENTION

This invention introduces hospital-type bed equipped with robotic arms. It applies the utmost of the research and developments in engineering to provide service automation for the benefits of healthcare system. Those who need some form of health care, people with disabilities, bedridden patients, and elderly people are among the immediate beneficiaries of this invention.

The demand for the trained staff grows proportionally to the growth of the above population. During a hospital stay or alike, a patient generally depends on the attending staff to receive all of the care functions. This dependency increases the responsibilities of the caring staff and it can lead to patient's dissatisfaction if care is provided with some latency. Therefore, automation of some of the services to the above population seems to be a break through solution. A patient can utilize the robotic arms to accomplish a series of desired activities without waiting for assistance. This service improvement to the patients at hospitals or other health care facilities, such as nursing homes, living facilities, outpatient clinics, and home health care centers is an envisioned solution to the health care staffing shortage. This invention provides a module to automate the following services to a bedridden patient:

1. Moving the patient to a desired position, lifting the patient from the bed, turning the patient to the sides and holding the patient in a particular position for a period of time.
2. Holding different members of patient's body at a possible desired position.
3. Feeding the patient with robotic arm assistance.

SUMMARY OF THE INVENTION

This innovative hospital bed enables the bedridden patient to accomplish a wide variety of desired activities without assistance of an attendance. Bed ridden patients can operate robotic arms on the bed sides via an electric keypad. This patient freedom would have beneficial effects for the patient's sense of independent well being and frees attending personnel and hospital staff to other tasks. On the other hand, it can create a compassionate care giving environment since it reduces the time pressure on the overwhelmed staff to respond to a need. An additional advantage is providing flexibility in the staffs time management that increases staff availability for the prominent activities. A further advantage is that a responsible staff, by utilizing the robotic arms, can perform tasks and activities that normally require two or more staff for accomplishment.

The features to be incorporated in the robotic arms and the hospital bed for developing this new product were researched and the process for acquisition, development, testing, and production have been determined. The new technologies introduced here are:

1) Advancements to the commercial robotic arm by adding a combination of rotational motion and linear displacement at different joints of the sectional arm.
2) Integration of the arm's functions in to the bed's function.
3) Developing a unit that is capable of performing multiple nursing tasks upon receiving the command(s) from a keyboard by the operator.

At the present time, the investment management has been established. Upon the approval of this application, this innovation will enter the next phase for development and subsequent increments to this initial release will be filed.

DETAILED DESCRIPTION OF THE INVENTION

Figure 1:
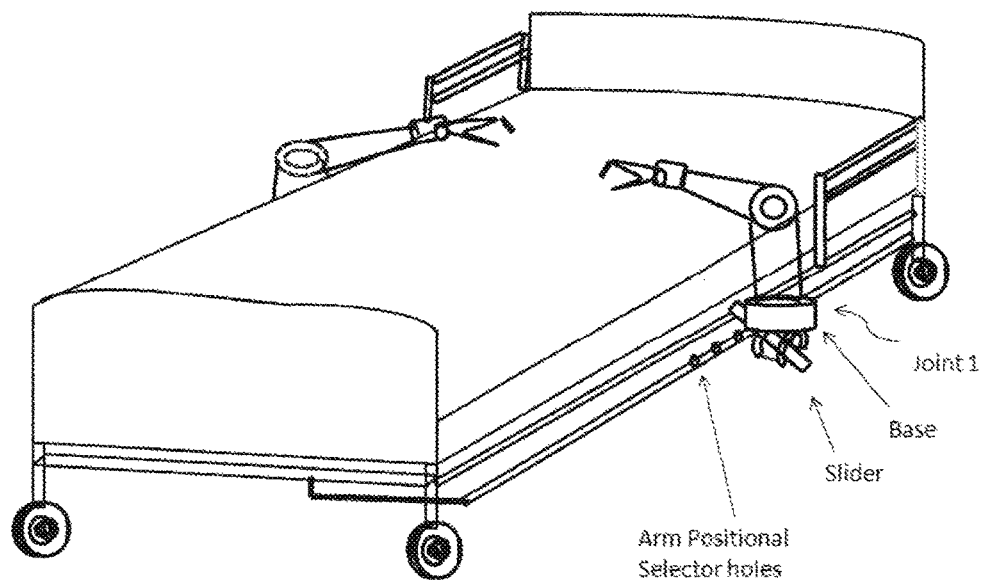
FIG. 1 illustrates the hospital bed with robotic arms engaged for operation.

Referring to FIG. 1, the arm will be attached to the bed frame at the base of the arm.

The central module of the arm is integrated into the bed's module and signals are transmitted to the sections of the arm via the electronics through the base of the arm.

Figure 3A:
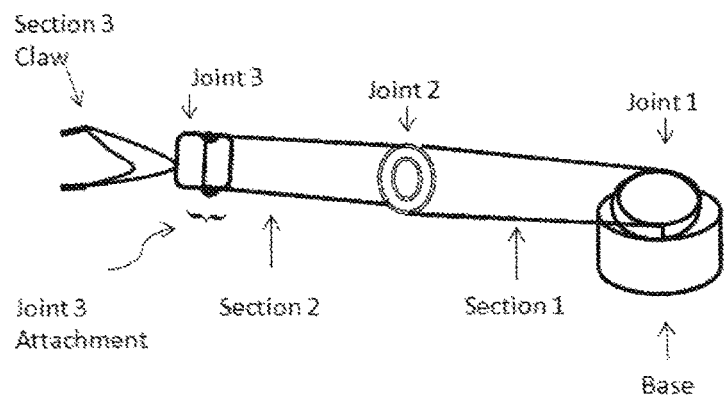
FIG. 3A illustrates the 3 sections of the arm that are linked by their joints; providing combined rotational motion and linear displacement of the arm.

Referring to FIG. 3A, the robotic arm has 3 sections that together provide complete range of rotational motion and linear displacement for the arm. One can operate each section individually or in a combination to accomplish a desired task. Each section can be locked in a set position to prevent undesired motion. Joint 1 connects section 1 to the base, and provides a vertical displacement and ±180 degrees rotational motion of section 1 about the vertical axis and side-to-side axis of the bed. Joint 2 connects section 2 to section 1, and provides ±180 degrees rotational displacement in each axis of the 3 dimensional space for section 2; and joint 3, connecting section 2 to section 3 (the robotic hand/claw) allows rotational and translational movement of section 3 for performing human kind functions. This section provides 6 Degrees of Freedom which includes linear translation in each axis of 3 dimensional space combined with ±180 degrees rotation about each axis. The mechanical hand can perform functions with a close emulation to human hand.

Figure 3B:
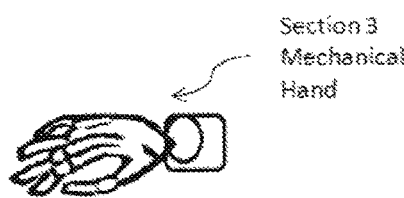
FIG. 3B illustrates the hand for section 3 where as FIG. 3A shows the claw for section 3.

Referring to FIG. 3 B, a robotic hand is illustrated that can perform human kind tasks.

Figure 4A:
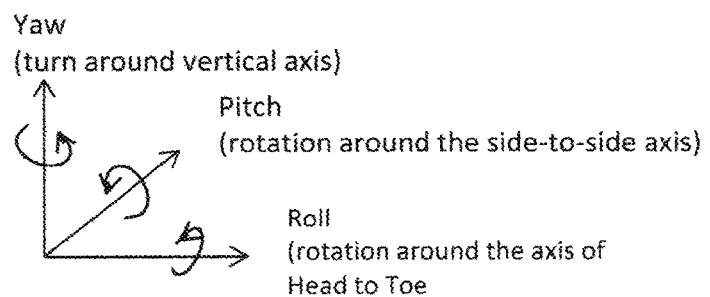
FIG. 4A illustrates the conventional Pitch, Yaw, Roll rotations, where a pitch rotation is a turn around the side-to-side axis of the object as moving downward and upward, a Roll rotation is a turn around the front-to-back axis of the object, and a Yaw is a rotation around the vertical axis with reference to the object center of mass.
Figure 4:
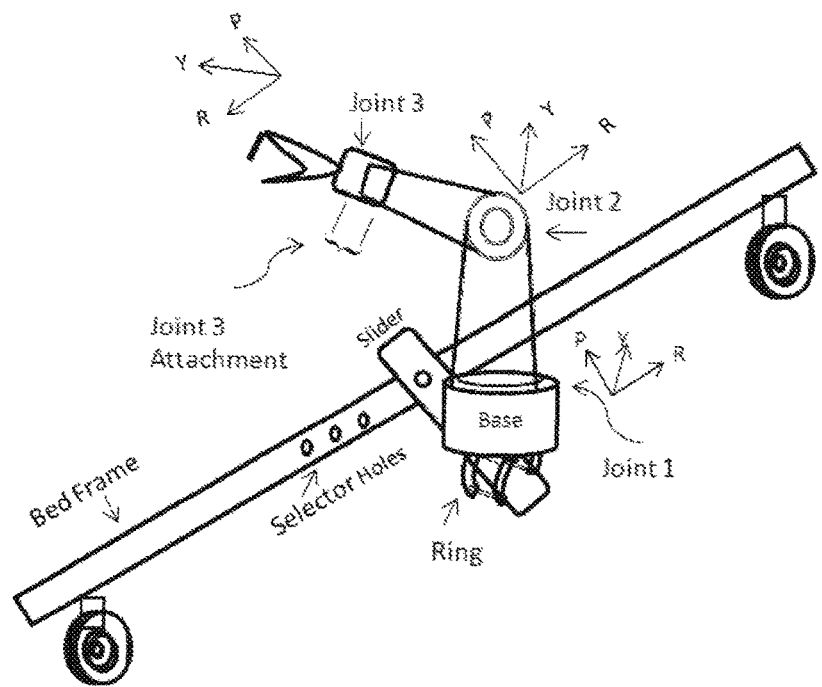
FIG. 4B illustrates the attachment apparatus of the arm, the base ring, the slider attaching to the frame, and the degrees of freedom of each section of the arm.

Referring to FIG. 4A, a Roll is a side to side turn which is a turn around the Head-to-Toe axis of the bed, a Pitch is a turn around the side-to-side axis of the object, and a Yaw is a turn around the vertical axis.

Referring to FIG. 4B, the base of the arm is fixedly secured on a ring that is mounted on a slider or a roller. The slider at one end is attached to the base of the robotic arm and on the other end can slide on the bed frame and can be fixed in a location via its selector pins/tab. This capability is designed to accommodate patients with different heights.

Figure 5:
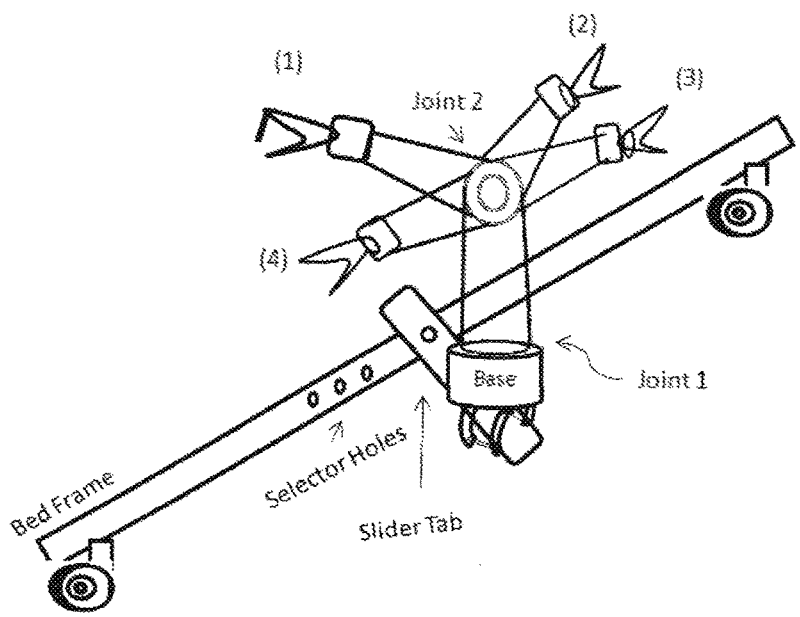
FIG. 5 illustrates rotation of the arm at joint 2 clockwise (CW) to position 3 and Counterclockwise (CCW) to position 4.

Referring to FIG. 5, section 2 capable of rotating ±180 degree about each axis at joint 2, has made a turn of +90 degrees to position 3 (yaw turn) and −180 degrees turn to position 4 (CCW Yaw turn).

Figure 6:
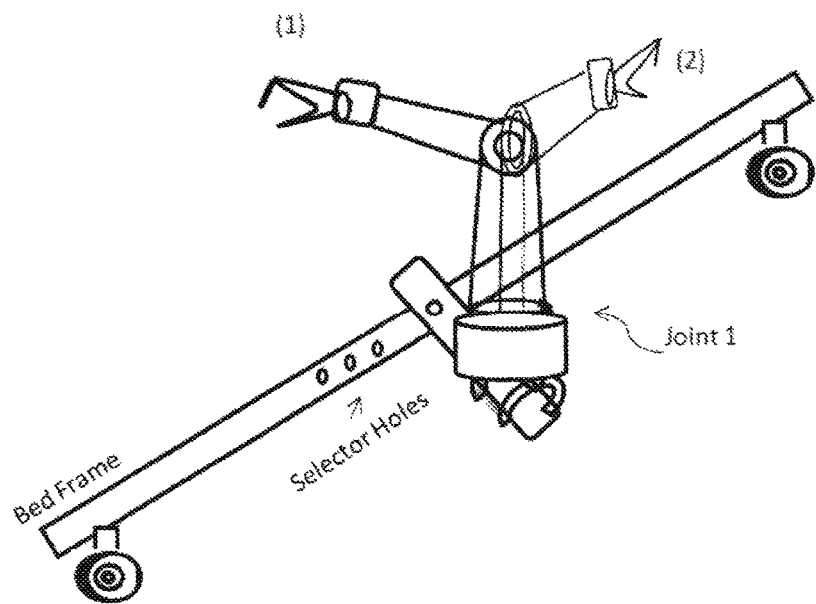
FIG. 6 illustrates the combination of the vertical displacement and rotation of the arm at joint 1 from position 1 to position 2.

Referring to FIG. 6, section 1 capable of rotating ±180 degrees yaw and pitch at joint 1, has made a turn of +90 degrees yaw to the right (position 2) and has an upward vertical displacement at the base to position 2.

The arm has a multi-layer operational module. The top level consists of two modes: "on" for operation and "off" for when the arm is at rest and not in use. The operator can select each arm individually or in combination. The "operation" mode consists of 5 submodes. With reference to FIG. 3, submode 1 operates section 1 of the arm to achieve a desired configuration by push down buttons on the keypad. Similarly, submode 2 operates section 2 of the arm, and submode 3 operates the terminus or the hand of the arm for a desired performance. Submodes 4 and 5 are allocated to "Auto" and "Manual" operations of the arm. The "Auto" mode consists of an activity list. Each activity has preprogrammed configuration(s) of the arm(s) and upon its selection, the arm would be adjusted to the proper position and the activity will be performed. The auto operation can be stopped or overridden at any stage of the operation. The operator has the option to select the preprogrammed configuration of the arm or make fine adjustment in the manual setup and continue with the operation of the desired task in auto mode.

Figure 2:
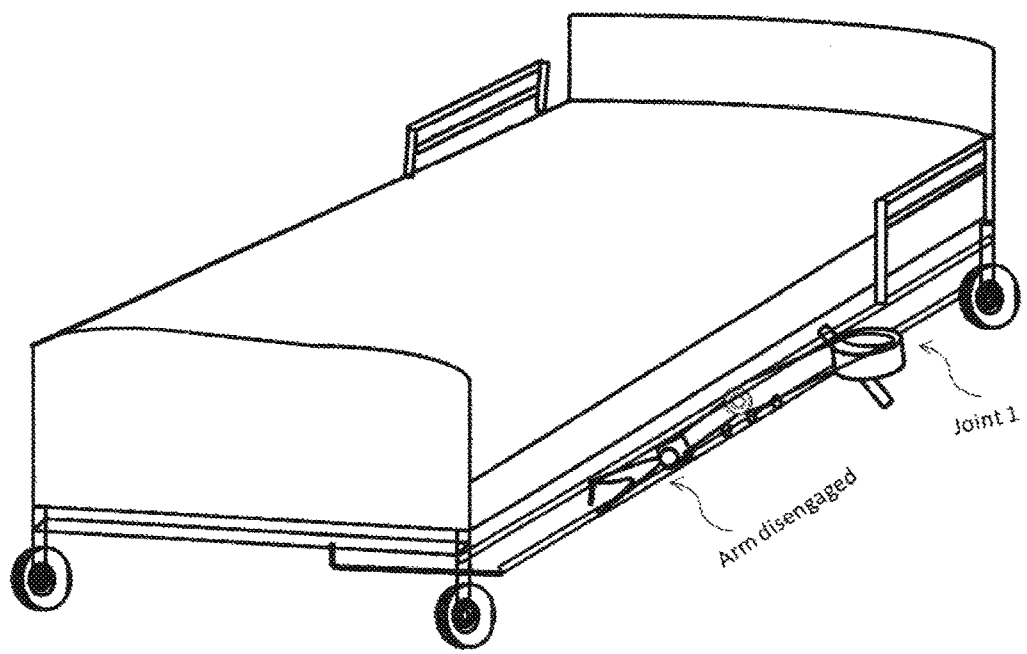
FIG. 2 illustrates the position of the arm when not intended for use; it would extend completely, lowered to the level of its base, in a position parallel to the bed frame, and latched to the bed's sideframe.

Referring to FIG. 2, the arms in the latched position are flexible at the joints and follow the selected adjustment of the bed segments. The "operation" mode will unlatch the arm(s). In this mode the arms are ready and would position to the commanded setting for a selected task.

The lower levels of operation for the auto and manual modes have been designed and progressing to completion. The integration effort includes: design the integration module; build and test the required software and computer module for the integration; test the integrated model, perform risk assessment and then enter the production phase.

The following tasks would be preprogrammed on the bed's computer system and are executable by push down buttons in the activity list of the keyboard. The robotic arms state-of-the-art control system detects the situational awareness and makes the proper adjustments to perform the selected act. The following activities are intended for auto mode performance:

a. Moving the patient up or down on the bed.
b. Lifting the patient from the bed.
c. Turning the patient to the sides, and holding the patient in a particular position for a period of time, sitting or laid down.
d. Holding any member of patient's body at a desired possible position.
e. Moving the food tray over the bed or away from the patient's bed.
f. Assisting the patient with eating the food.

Product Features

1. The arm is made of plastic and features both human hand and a grasping claw at the end effector. The hand and the grasping claw are exchangeable with one another.
2. Section 1 has rotational motion and capable of moving up and down in the base.
3. Section 2 is adjustable via push down button for ±180 degrees movement in three dimensional spaces: upward and downward, forward and backward, inward and outward (Pitch, Yaw, and Roll).
4. Section 3 has both linear translation and rotational motion about each axis in 3 dimensional spaces.
5. The operation of each section can be locked and unlocked by an administrator for controlling the agility of the unit.
6. The arms can be operated individually or in a pair.
7. The arm can be operated by a keyboard of its own and also by the bed's keyboard. (operations by voice is projected in the next incremental design)
8. The special features include the electronic buttons to operate the bed and the robotic arms.

Product Specifications

Any hospital bed with the following features that is used not only in hospitals, but in other health care facilities, is designed for the comfort and well-being of the patient and for the convenience of health care givers. Hence this invention at the base line uses the following existing features of the hospital bed. Additional product specifications are applicable based on the selected vendor's product.

a. Fully electric high/low elevation
b. Electric head and knee elevation with Auto Contour feature
c. Easy-to-use keypad
d. Optional patient control lockouts For the robotic arms, invention assumes the following specifications with a margin for modification based on the selected vendor's specification.

Processor 64 8-bit microcontroller
Speed 16-32 MIPS
Memory 64 KB Flash ROM, 2 KB EEPROM
Language C, C++
Operations keyboard attached to bed, Wireless, and SB Cable to PC for reboot.
Arm Length fully extended=24"
Height fully extended=21"
Base Diameter 6"
Power Supply 10 V

What is claimed is:

1. A hospital bed or chair with bed configuration comprising:
a frame having a first lower side rail on a right side and a second lower side rail on a left side;

a pair of robotic arms, wherein each robotic arm has a base mounted on a respective lower side rail via a sliding bar attachment, the sliding bar attachment includes a slider which translates along the respective lower side rail and at least one tab configured to engage with a hole on the respective lower side rail to lock a desired position of the robotic arm relative to the frame;
each robotic arm comprising:
a first section attached to the base at a first joint, wherein the first section is rotatable up to 180 degrees about a vertical axis extending through the base, pivotal up to 180 degrees about an axis extending perpendicular to each of the first lower side rail and second lower side rail and vertically displaceable with respect to the base;
a second section pivotally attached to the first section at a second joint providing up to 180 degrees rotation of the second section in each of three axes; and
a third section including an end effector removably attached to the second section at a third joint providing rotational and translational movement of the third section with respect to the second section,
wherein each section can be adjusted and locked independently or in combination with each of the other sections;
wherein electronics for controlling each of the robotic arms are affixed to the frame;
wherein the end effector is selected from the group comprising a claw or a hand that can perform human kind designated tasks with close emulation to a human hand; and
wherein the pair of robotic arms can be operated individually or together to hold a patient body in a desired position for a desired length of time, move the patient up and down on the bed, lift the patient from the bed, turn the patient from side to side, hold the patient in a particular position, assist the patient for different positioning, move objects toward and away from the bed and assist the patient with eating and drinking.

2. The hospital bed or chair with bed configuration of claim 1 wherein each of the pair of robotic arms can be positioned and latched in a disengaged configuration extending parallel to the respective lower side rail.

3. The hospital bed or chair with bed configuration of claim 1 wherein the electronics for controlling each of the robotic arms are integrated with a control system for controlling movement of the bed or chair with bed configuration, wherein the control system is activated via a keypad having wired and/or wireless features.

4. The hospital bed or chair with bed configuration of claim 3, wherein the control system is configured to execute preprogrammed commands.

* * * * *